(12) United States Patent
Capps

(10) Patent No.: US 8,766,490 B2
(45) Date of Patent: Jul. 1, 2014

(54) SYSTEM AND METHOD FOR MONITORING OPERATION OF SWITCH ELEMENTS

(75) Inventor: Charles Capps, Carmel, IN (US)

(73) Assignee: Enerdel, Inc., Greenfield, IN (US)

( * ) Notice: Subject to any disclaimer, the term of this patent is extended or adjusted under 35 U.S.C. 154(b) by 692 days.

(21) Appl. No.: 13/072,101

(22) Filed: Mar. 25, 2011

(65) Prior Publication Data

US 2012/0242171 A1  Sep. 27, 2012

(51) Int. Cl.
  *B60R 16/03* (2006.01)
(52) U.S. Cl.
  CPC ........................................ *B60R 16/03* (2013.01)
  USPC .............................. 307/134; 307/9.1; 307/109
(58) Field of Classification Search
  CPC ...... B60R 16/0232; B60R 16/03; H02H 1/00; H02H 3/14
  USPC .......................................... 307/134, 9.1, 109
  See application file for complete search history.

(56) References Cited

U.S. PATENT DOCUMENTS

| | | | |
|---|---|---|---|
| 3,559,051 A | | 1/1971 | Mazurek |
| 3,569,929 A | * | 3/1971 | Wood ............................ 340/428 |
| 3,746,880 A | | 7/1973 | Iritani et al. |
| 4,677,308 A | | 6/1987 | Wroblewski et al. |
| 4,853,685 A | | 8/1989 | Vogt |
| 4,864,285 A | | 9/1989 | Rodden |
| 5,096,147 A | | 3/1992 | Brohm et al. |
| 5,136,280 A | | 8/1992 | Heggli |
| 5,277,244 A | | 1/1994 | Mehta |
| 5,436,788 A | | 7/1995 | Wallaert |
| 5,506,573 A | | 4/1996 | Ewing et al. |
| 5,585,678 A | | 12/1996 | Dijk et al. |
| 5,619,110 A | | 4/1997 | Sugimoto et al. |
| 5,760,587 A | * | 6/1998 | Harvey .......................... 324/434 |
| 5,886,531 A | | 3/1999 | Delcourt et al. |
| 6,496,010 B1 | | 12/2002 | Myers et al. |
| 6,507,283 B1 | | 1/2003 | Calvin |
| 6,590,752 B1 | | 7/2003 | Schaper et al. |
| 8,040,139 B2 | * | 10/2011 | Plagens et al. ................ 324/509 |
| 2004/0183522 A1 | | 9/2004 | Gunn et al. |
| 2004/0240235 A1 | | 12/2004 | Min |

(Continued)

OTHER PUBLICATIONS

Xiufang Jia; Chengyong Zhao, Baoshu Li, Affection of Distributed Capacitance on and a New Method of Detecting on Detecting DC System Earth Fault, Power System Technology, 1998. Proceedings.

(Continued)

*Primary Examiner* — Adi Amrany
(74) *Attorney, Agent, or Firm* — Faegre Baker Daniels LLP

(57) ABSTRACT

Systems and methods are provided for monitoring operation of a circuit having a DC power supply, a load, and a switch element connecting the DC power supply to the load. The system includes a capacitive element coupling a first input node of a sensor element to a first interconnection node of the circuit between a first voltage supply terminal of the DC power supply and the load. The system also includes a grounding structure coupling a second input node of the sensor element to a ground plane isolated from the DC power supply. In the system, the grounding structure is positioned with respect to a second interconnection node of the circuit, between a second voltage supply terminal of the DC power supply and the load, so as to define a stray capacitance for carrying a transient signal resulting from the opening or closing of the switch element, which can be detected through the sensor element for monitoring the current switch state of the switch element.

19 Claims, 2 Drawing Sheets

(56) References Cited

U.S. PATENT DOCUMENTS

| | | |
|---|---|---|
| 2007/0024288 A1 | 2/2007 | Hu |
| 2010/0207635 A1 | 8/2010 | Plagens et al. |
| 2012/0081124 A1 | 4/2012 | Kimes et al. |
| 2012/0250203 A1* | 10/2012 | Makihara ........................ 361/86 |
| 2013/0151175 A1* | 6/2013 | Streit .............................. 702/58 |

OTHER PUBLICATIONS

Kui-Jun Lee, Nam-Ju Park, Kyung-Hwan Kim and Dong-Seok Hyun, Simple Fault Detection and Tolerant Scheme in VSI-fed Switched Reluctance Motor, Power Electronics Specialists Conference, 2006.

* cited by examiner

100

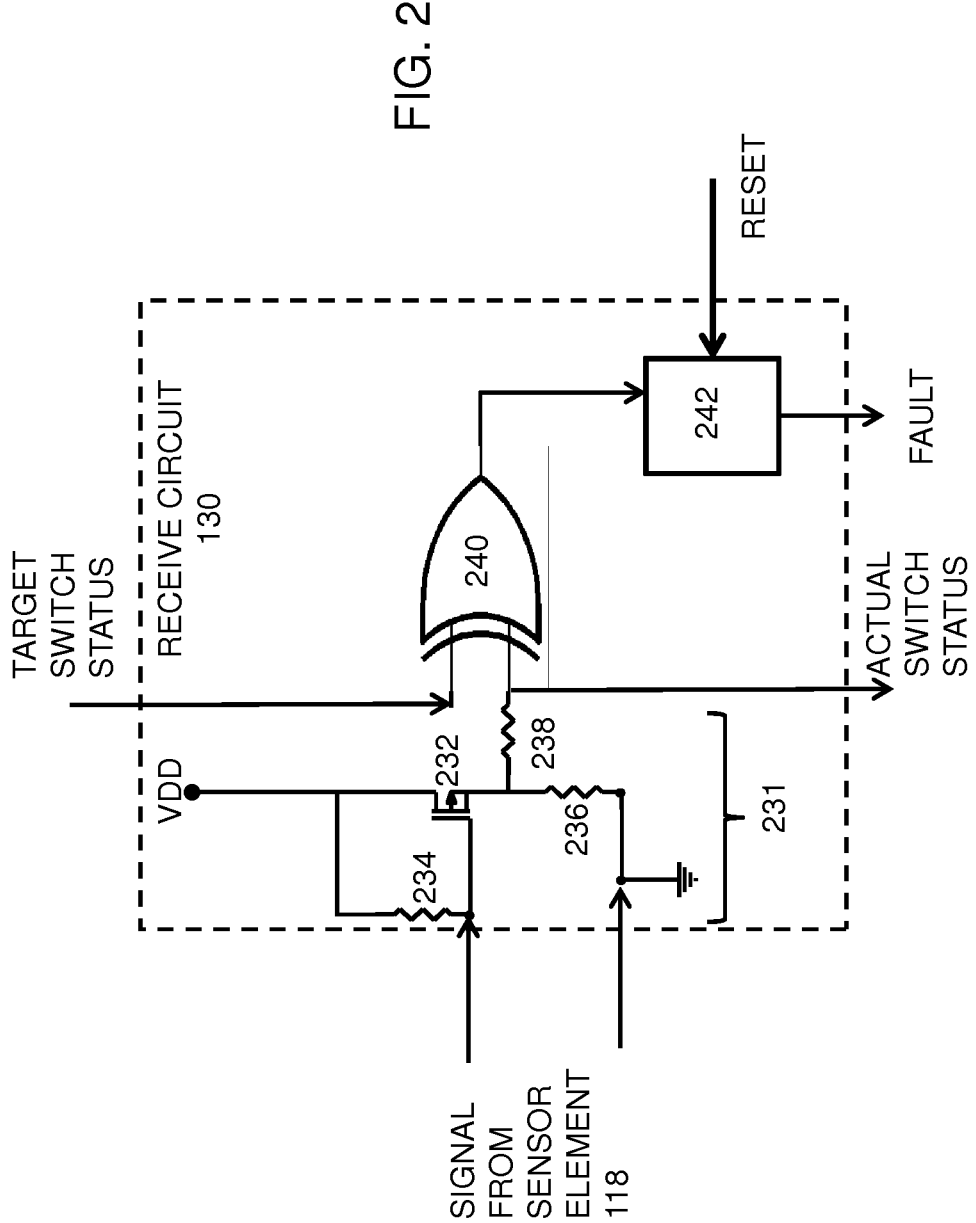

SYSTEM AND METHOD FOR MONITORING OPERATION OF SWITCH ELEMENTS

FIELD

The subject matter herein generally relates to switch elements in DC electric systems and in particular to systems and methods for monitoring the operation of a switch element in a DC electric system.

BACKGROUND

Electric vehicles and hybrid electric vehicles require onboard batteries to power their electric drive systems. The performance requirements of such vehicles generally require combining a large number of batteries together to provide a sufficiently high voltage and current for powering the electric drive system. For example, Li-ion batteries can be stacked to produce battery packs or modules with very high voltage and current capabilities. In conventional electric or hybrid electric vehicles, such Li-ion batteries often are configured to generate voltages on the order of 400V DC.

Typically, in such vehicle applications, the battery voltage is applied to the drive system under control of a battery management system (BMS) electronic controller. Specifically, the battery is connected to the vehicle via a contactor or other type of switch element controlled by the BMS. Throughout the lifetime of the vehicle, it is possible that the contactors may fail or degrade, resulting in improper operation. Such contactor faults or failures can arise from the very large operating currents and transients that are typically conducted by the contactors during operation of the vehicle. For example, currents in electric vehicles can exceed 200A under some conditions. As a result, the switch elements used to connect the battery to the vehicle may become stuck open or closed under mechanical or electrical stress during operation.

When such contactor failures occur, it is generally desirable to generate control signals for the BMS such that the battery can be disabled to prevent further damage to the vehicle or to reduce the risk of injury to the driver or passengers of the vehicle. Further, it is generally desirable to generate signals such that service personnel can easily assess and repair the contactor failure.

Conventional methods for detecting the physical state of a contactor, a relay, or other types of switch elements in high voltage DC systems typically rely on coupling or injecting a waveform on a first side of a switch element and thereafter detecting the waveform on the second side of the switch element. However, such configurations typically require additional components and have additional power requirements.

SUMMARY

Embodiments of the invention concern new systems and methods for monitoring the operation of switching elements. In a first embodiment of the invention, a system is provided for monitoring operation of a circuit having a DC power supply, a load, and a switch element connecting the DC power supply to the load. The system includes a sensor element having a first input node, a second input node, and an output node. The system also includes a capacitive element coupling the first input node of the sensor element to a first interconnection node of the circuit between a first voltage supply terminal of the DC power supply and the load. The system further includes a grounding structure coupling the second input node of the sensor element to a ground plane that is galvanically isolated from the DC power supply. In the system, the grounding structure is arranged with respect to a second interconnection node of the circuit between a second voltage supply terminal of the DC power supply and the load so as to define a stray capacitance for carrying a transient signal resulting from an opening or closing of the switch element.

In a second embodiment of the invention, a battery operated system is provided. The system includes a battery module, a load circuit, and a switch element for coupling the battery module to the load circuit. The system also includes a controller element for operating the switch element and having a grounding structure coupled to a ground plane that is galvanically isolated from the battery module. The system further includes a short circuit path coupling a first interconnection node between a first supply terminal of the battery module and the load circuit to a second interconnection node between a second supply terminal of the battery module and the load circuit. In the system, the short circuit path includes a capacitive element coupling the controller element to the first interconnection node and a stray capacitance coupling the controller element to the second interconnection node. The stray capacitance is defined by positioning the grounding structure sufficiently close to the second interconnection node; the stray capacitance is configured for carrying a transient signal resulting from an opening or closing of the switch element.

In a third embodiment of the invention, a method for monitoring operation of a circuit having DC power supply, a load, and a switch element connecting the DC power supply to the load is provided. The method includes coupling a first input node of a sensor element to a first interconnection node of the circuit between a first supply terminal of the DC power supply and the load. The method also includes coupling a second input node of the sensor element to a grounding structure coupled to a ground plane galvanically isolated from the DC power supply, arranging the grounding structure with respect to a second interconnection node of the circuit between a voltage second supply terminal of the DC power supply to define a stray capacitance for carrying a transient signal resulting from an opening or closing of the switch element. The method further includes processing an output signal that is responsive to the opening or closing of the switch at an output node of the sensor element.

BRIEF DESCRIPTION OF THE DRAWINGS

Embodiments of the present application will now be described, by way of example only, with reference to the attached Figures, wherein:

FIG. 2 is a block diagram of an exemplary receive circuit for the electrical system in FIG. 1.

DETAILED DESCRIPTION

Figure 1:
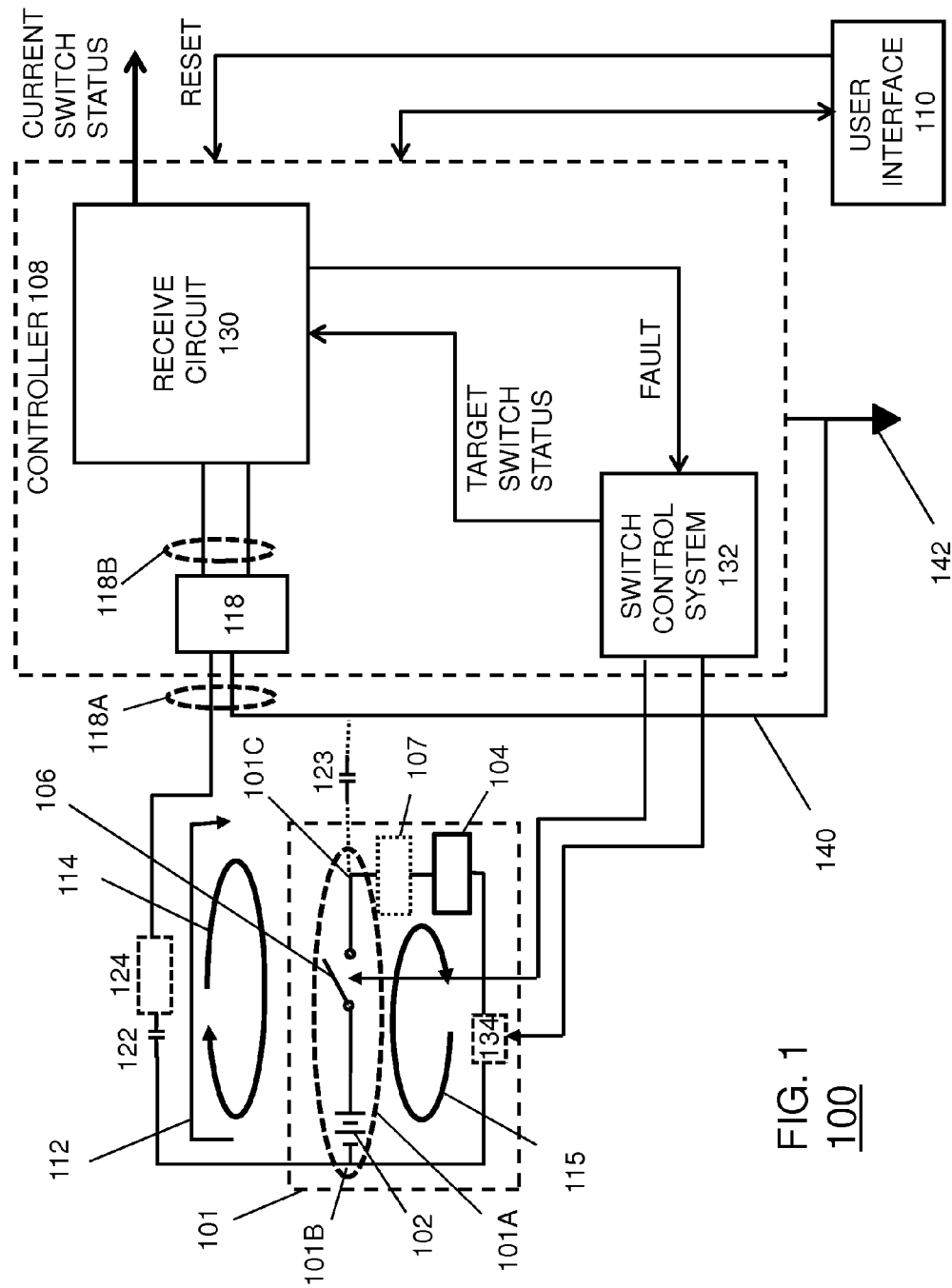
FIG. 1 is a block diagram of an electrical system configured in accordance with an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders or concurrently with other acts or events. Furthermore, not all illustrated acts or events are required to implement a methodology in accordance with the present invention.

As described above, the detection of switch element failures in high voltage DC systems is of concern, particularly in the field of electric vehicles. However, in the case of electric vehicles, additional requirements can apply since such vehicles are being used by consumers and will be in service for a relatively long period of time, typically greater than three years. Thus, the systems for detecting switch elements failures in electric vehicles need to provide high reliability, long operational lifetimes, low power requirements, and relative insensitivity to environmental conditions. As described above, conventional systems relying on the injection or the coupling of a high frequency signal typically require a number of additional components in order to generate the high frequency signal. Therefore, aside from the additional power and weight considerations, particularly with respect to the generation and injection of the high frequency signal, such additional complexity also requires additional components which can fail over time.

In view of the limitations of conventional monitoring techniques, the various embodiments of the invention provide new systems and methods for monitoring the operation of a switch element in DC electric systems. In the various embodiments of the invention, the operation of the switch element in a load circuit is monitored using a short-circuit path through the input nodes of a sensor element, in which a first input node is capacitively coupled to the circuit that includes the switch element and a second input node is coupled to a grounding structure. In the various embodiments, the grounding structure is galvanically isolated for the DC power supply of the load circuit but is placed in sufficient proximity to the load circuit to define a stray or parasitic capacitance. As a result, a monitoring loop is defined by the combination of the switch element, the DC power supply of the load circuit, and the short-circuit path.

Further, the various embodiments eliminate the need for providing a system for injecting a high frequency signal into the load circuit. Rather, the various embodiments take advantage of the transient signal generated during the opening or closing of the switch element—that is, the transient signal generated by the inductance of the load circuit opposing the application or the interruption of current in the load circuit.

Thus, in operation, the sensor element in the short-circuit path can be used to detect the presence or absence of the transient generated during the opening or closing of the switch element. The output of the sensor element can thereafter provide a switch signal, indicating when an opening or closing of the switch element has occurred. This switch signal at the output node can be used, for example, in comparison to a target switch status signal from a switch control system to generate a fault signal if the intended opening or closing of the switch element as commanded by the switch control system does not occur.

As a result, the various embodiments provide a system for monitoring operation of switch elements in DC electrical systems using substantially fewer components than in conventional DC electrical systems. Accordingly, the weight, space, and power requirements of such a system are substantially lower than those of conventional monitoring systems.

Referring now to FIG. 1, there is shown a block diagram of an exemplary DC electric system 100 in accordance with an embodiment of the invention. As shown in FIG. 1, DC electric system 100 includes a load circuit 101 consisting of a DC power supply 102 that is electrically coupled to a load 104 through a switch element 106. In the various embodiments, the DC power supply 102 can comprise one or more DC power sources, such as batteries, AC/DC converters, chemical fuel cells, solar cells, generators, and alternators. However, the various embodiments of the invention are not limited in this regard and any other types or any combination of DC power sources can be used.

The switch element 106 can be any type of device, electrical circuit, or other component configured for selectively disconnecting portions of an electric circuit. In the various embodiments of the invention, the switch element 106 can include devices consisting of mechanical switches, solid-state switches, switching tubes, or any other type of switch technologies. In some configurations, the switch element 106 can be controlled directly or indirectly. For example, the switch element 106 can be controlled using a controller 108, where the controller 108 operates automatically or in response to user input via a user interface 110. The controller 108 can be, for example, a battery management system (BMS) or other devices or systems for controlling operation of the DC electric system 100. However, the various embodiments are not limited in this regard. In some embodiments, operation of the switch element 106 can be performed by other elements in the DC electric system 100, including elements external to the controller 108.

As described above, the operation (i.e., closing or the opening) of the switch element 106 can be monitored through the use of a short-circuit path 112. The short-circuit path 112 is coupled to ends or nodes of a circuit portion 101A of the load circuit 101. This circuit portion 101A includes the DC power supply 102 and the switch element 106, but excludes the load 104. The nodes of the circuit portion 101A include a first interconnection node 101B and a second interconnection node 101C.

As shown in FIG. 1, the short-circuit path 112 includes at least a capacitive element 122, a stray or parasitic capacitance 123, and a sensor element 118 of the controller 108. The sensor element 118 has input nodes 118A and one or more output nodes 118B. In particular, a first portion of the short-circuit path 112 is defined by coupling a first of the input nodes 118A to the first interconnection node 101B in the circuit portion 101A through a capacitive element 122. A second portion of the short-circuit path 112 is defined by first coupling a second of the input nodes 118A to a grounding structure 140, which defines or is coupled to a ground plane 142 of the controller 108. The second portion of the short-circuit path 112 is then completed by arranging the grounding structure 140 relative to the second interconnection node 101C in the circuit portion 101A so as to define the capacitance 123. The short-circuit path 112 is defined by the combination of the capacitive element 122, the sensor element 118, the grounding structure 140, and the capacitance 123. Thus, a monitoring loop 114 is formed by the short-circuit path 112 in combination with the circuit portion 101A and operates in parallel with a power supply loop 115 defined by the load circuit 101.

Although the short-circuit path 112 is shown as being formed in a separate element from the controller 108, the various embodiments are not limited in this regard. In some embodiments, the short-circuit path 112, or portions thereof, can be integrated into the controller 108.

In the various embodiments, the capacitive element 122 can be any type of device or structure that provides a capacitance along the short-circuit path 112. Accordingly, the capacitive element 122 can be formed using one or more capacitors in combination with other elements. Further, the capacitive element 122 can be formed using any number and combination of discrete capacitor devices or capacitors integrated into other devices. Additionally, the amount of capacitance provided by the capacitive element 122 can vary in the various embodiments. For example, in one embodiment, the amount of capacitance can be approximately 1000 pF. However, the various embodiments are not limited in this regard. Rather, any other amount of capacitance can be used, depending on the type of high frequency signal being generated by the switch element 106. Accordingly, the capacitance can be in the range of 100 pF to 0.1 µF.

In the various embodiments, the capacitance 123 is provided by positioning one or more portions of the grounding structure 140 in proximity to an end of the circuit portion 101A so as to cause the formation of the capacitance 123 between the grounding structure 140 and the second interconnection node 101C that is sufficient for transmitting a transient (i.e., high frequency) signal generated by the opening or closing of the switch element 106. For example, this capacitance 123 can be formed by positioning the grounding structure 140 at a distance of less than or equal to about 5 inches with respect to second interconnection node 101C. For example, in the various embodiments, this distance can be between about 0.5 inches to about 5 inches, such as between about 0.5 inches and 2 inches. Such an arrangement can provide a capacitance between about 0.5 and about 50 pF, such as between about 1 and about 10 pF, which is sufficient for carrying a transient signal typically associated with the opening or the closing of most types of switch devices that can be used to form the switching element 106. In some embodiments, the grounding structure 140 can be configured so its position is adjustable relative to the second interconnection node 101C in order to adjust the capacitance 123 for carrying the transient signal or portion thereof that is generated during opening or closing of the switch element 106.

In the various embodiments, the sensor element 118 can be configured in various ways. For example, in some embodiments, the sensor element 118 can be an optocoupler, a transformer, or any other device in which the input nodes 118A are galvanically isolated from the output nodes 118B. In other embodiments, the sensor element 118 can be an amplifier circuit, a buffer circuit, or any other circuit with output nodes 118B that are not galvanically isolated from the input nodes 118A. However, the various embodiments are not limited in this regard and the sensor element 118 can be any other type of device or circuit configured for generating a useful signal at the output nodes 118B in response to a signal at the input nodes 118A. Further, the short-circuit path 112 can include other component(s) 124 for matching or any other purposes. For example, in one embodiment, a component 124 can include a matching resistor or other matching circuit.

As shown in FIG. 1, the controller 108 can also include a receive circuit 130 coupled to the output nodes 118B of the sensor element 118. The receive circuit 130 can be configured to include logic for generating signals indicative of the current physical operational state of the switch element 106 (e.g., toggling, not toggling, toggling open, toggling closed). Further, the receive circuit 130 can also be configured to include logic for generating a fault signal (FAULT) when the current physical state of the switch element 106 fails to match a target operational state of the switch element 106.

One exemplary process for operating the DC electric system 100 follows. First, the controller 108 can generate signals or instructions for setting a state of the switch element 106. For example, if the load 104 is a drive system for an electric vehicle and drive system operation is desired, the controller 108 can send signals to the switch element 106 to cause it to close and thus connect the DC power supply 102 to the load 104. Alternatively, if operation of the vehicle needs to be paused or terminated, the controller 108 can send signals to the switch element 106 to cause it to open and thus disconnect the DC power supply 102 from the load 104. As a consequence of the opening and closing of switch element 106, a transient signal (i.e., a high frequency signal) is generated and propagates through the load circuit 101. At least a portion of this transient signal propagates about the monitoring loop 114, including the short-circuit path 112.

In the various embodiments, the transient signal generated in the load circuit 101 is due to the inductance present in the load circuit 101. That is, any circuit including conductors, such as the load circuit 101, will generally include some type of inherent or parasitic inductance. Typically, such an inductance will be on the order of about 10 nH to about 25 nH per inch. This inductance is conceptually illustrated in FIG. 1 as inductance 107. As a result, when the switch element 106 is closed, the inductance 107 will initially oppose the increases in the current and voltage being applied by the DC power supply 102 to the load circuit 101. The inductance 107 will thus temporarily operate as an open circuit in the load circuit 101, causing a transient signal characterized by a large, decaying voltage spike. Similarly, when the switch element 106 is opened, the inductance 107 will initially oppose the decrease in the current and voltage being applied by the DC power supply 102 to the load circuit 101, thus also causing a transient signal characterized by a large voltage spike, opposite in polarity to the voltage spike caused by closing of the switch element 106.

Regardless of whether or not a transient signal is propagating along the monitoring loop 114, the sensor element 118 generates an output signal at the output nodes 118B based on the signal at the input nodes 118A. In the various embodiments, because the short-circuit path 112 is DC-isolated using at least the capacitive element 122 and no path to the ground plane 142 is available in the short-circuit path 112, the sensor element 118 is also effectively isolated from the power supply loop 115. Thus, even in the absence of a transient signal in the short-circuit path 112, the output signal of the sensor element 118 will not be based on the DC signal from the DC power supply 102.

The output signal at the output nodes 118B can be generated in a variety of ways at the sensor element 118. For example, in one configuration, the sensor element 118 can be an optocoupler. Thus, depending on the signal present at input nodes 118A, the transistor in the optocoupler can be turned on or off to provide the output signal at output nodes 118B. In another configuration, the sensor element 118 can be a transformer where the input nodes 118A and the output nodes 118B define the ends of first and second windings. Thus, a signal is induced at the output nodes 118B (i.e., the second winding) based on the signal present at the input nodes 118A (i.e., at the first winding). This induced signal thus provides the output signal. In some embodiments, the use of a transformer for the sensor element 118 can provide many, if not all, the advantages described above.

Once the output signal is generated by the sensor element 118 at output nodes 118B, the receive circuit 130 can then process the output signal. First, the output signal can be used to generate a signal representing current operational state of the switch element 106. That is, based on the characteristics of the output signal at the output nodes 118B, the receive circuit 130 can generate a signal that indicates when an opening or the closing of the switch element 106 has occurred. For example, the output signal at the output nodes 118B can be a time-varying waveform with pulses, transients, or other temporary features indicating that a toggling of the switch element 106 has occurred. For example, as shown in FIG. 1, the receive circuit 130 can provide a CURRENT SWITCH STATUS (CSS) signal that indicates the current state of the switching element 106 (i.e., whether or not it is currently toggling).

Thus, the receive circuit 130 can be configured to include elements for detecting the occurrence of such features in the output signal at output nodes 118B. For example, a small signal transistor can be used to detect the presence of the features. Alternatively, a microprocessor, peak detector, or logic gate could also be used. However, the various embodiments of the invention are not limited to these methods. Further, the receive circuit 130 can also communicate a signal indicating the toggling of the switch element 106 to other components in the DC electric system 100 or the controller 108, such as a switch control system 132.

In addition to determining the occurrence of a toggling of the switch element 106, the receive circuit 130 can also be configured to generate a fault signal indicating that an intended toggling of the switch element 106 has not occurred. That is, the receive circuit 130 can include logic or functionality for receiving a signal indicating when the switch element 106 is supposed to be toggled. For example, as shown in FIG. 1, the switch control system 132 can provide a TOGGLE SWITCH STATUS (TSS) signal that indicates when toggling is being attempted by the switch control system 132.

In operation, the receive circuit 130 can compare the signals from the sensor element 118 with the TSS signal from the switch control system 132. If the TSS signal indicates an attempt to toggle the switch element 106 and no toggling of the switch element 106 is detected by the receive circuit 130, a fault signal can be generated. Alternatively, if the TSS signal indicates no attempt to toggle the switch element 106 but toggling of the switch element 106 is detected by the receive circuit 130, a fault signal can also be generated.

In the various embodiments, the receive circuit 130 can include logic for comparing these signals. For example, the receive circuit 130 can also include a delay, a buffer, or any other types of components for synchronizing the TSS signal with the output of the sensor element 118 for purposes of such a comparison. Additionally, the receive circuit 130 can also include components for allowing some amount of time delay or difference between the signal being compared.

In some configurations, the receive circuit 130 can also be configured to maintain the fault signal until the occurrence of a reset event. That is, the receive circuit 130 can be configured to reset the fault signal when it is powered down. Alternatively, the receive circuit 130 can also be configured to reset the fault signal when a reset signal is received. In one configuration, such a reset signal can be provided by the user via the user interface 110 to the controller 108 and thereafter to the receive circuit 130. In another configuration, such an external signal can be automatically generated when a component, such as the switch element 106, is replaced.

In some embodiments, the fault signal can be used to prevent further operation of the DC electric system 100. For example, the fault signal can be used to operate a secondary or backup switch element 134 to disconnect the DC power supply 102 from the load 104. Alternatively, the fault signal can be used to limit the operation of the DC electric system 100.

For example, the fault signal can also be used to activate an auxiliary, short-term DC power supply and disconnect the main power supply. Alternatively, the fault signal can be used to begin a timer in controller 108 or elsewhere and thereafter indicate to the user that at the end of the timer countdown, the DC electric system 100 will be deactivated.

In the various embodiments, the receive circuit 130 can be configured in a number of ways to provide the functionality described above. Referring now to FIG. 2, there is shown a block diagram of an exemplary configuration for the receive circuit 130 in accordance with an embodiment of the invention.

As shown in FIG. 2, the outputs of the sensor element 118 are coupled to the ground and input nodes of an amplifier circuit 231 formed by a transistor 232 and resistors 234, 236, and 238. The configuration and arrangement of these elements can be selected to provide an appropriate logic signal to an exclusive-OR (XOR) gate 240. Further, the configuration and arrangement of these elements can be selected to provide such a logic signal in response to the configuration of the output signal. For example, in the case of the output signal comprising a waveform, the transistor 232 can be a small-signal transistor. However, the invention is not limited to the configuration shown in FIG. 2 for the amplifier circuit 231. Rather, the amplifier circuit 231 can be formed using different combinations of elements.

The logic signal generated by the amplifier circuit 231 represents the actual (i.e., physical) operational state of the switch element 106 (i.e., toggling or not toggling, toggling open or closed). This logic signal can be provided, directly or indirectly, as the CSS signal. For example, the CSS signal can be used by the controller 108 to generate at the user interface 110 a display or other indication of the physical state of switch element 106.

To compare the actual contact state signal from the amplifier circuit 231 and the TSS signal, a comparison of these signals can be performed using the XOR gate 240. As described above, one or more components (not shown) can be provided to synchronize signals for the comparison. The TSS signal can be provided, directly or indirectly. Thus, one of ordinary skill in the art will recognize that the receive circuit 130 can include components to provide an appropriate logic signal for the XOR gate 240 based on the TSS signal. In operation, as long as the target switch status signal and current switch status match, the XOR gate 240 provides a first value, indicating a match. However, if the current switch signal varies from the target switch state signal, the output of the XOR gate 240 changes and a second value is provided, indicating a difference and thus a fault.

Although the output of the XOR gate 240 will revert to a first value once the TSS signal indicates that toggling is no longer being attempted, such a result can be undesirable. Accordingly, in the configuration of FIG. 2, the receive circuit 130 can include components for maintaining a signal indicating a fault until a reset event occurs. Thus, the fault signal is maintained even when the switch element 106 resumes normal operation. For example, as shown in FIG. 2, the receive circuit 130 can include a gated latch circuit 242. In operation, the gated latch circuit 242 is configured to store and output a first signal (indicating no fault) when the XOR gate 240 is providing a first value and to allow changes in the first signal. When the gated latch circuit 242 receives the second value from the XOR gate 240, the gated latch circuit 242 is configured to store and output a second signal indicating a fault. However, the gated latch circuit 242 is also configured to prevent any further changes in the stored value, and consequently in its output, until power to the gated latch circuit 242 is discontinued. As one of ordinary skill in the art will recognize, several types of gated latch circuits can be used for this purpose.

Portions of the DC electric system 100 and supporting components can take the form of hardware elements, software elements or elements containing both hardware and software. In one embodiment, the software portions can include, but are not limited to, firmware, resident software, microcode, etc. Furthermore, these software portions can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the system can be centralized or distributed (or a combination thereof) as known to those skilled in the art.

A data processing system suitable for storing program code and for executing program code, which can be implemented in any of the above-referenced devices described herein, can include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. I/O devices (including but not limited to keyboards, displays, pointing devices, etc.) can be coupled to the system either directly or through intervening I/O controllers.

Applicants present certain theoretical aspects above that are believed to be accurate and that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Other configurations are also possible. Thus, the breadth and scope of the present invention should not be limited by any of the above described embodiments. Rather, the scope of the invention should be defined in accordance with the following claims and their equivalents.

Although aspects of the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A system for monitoring operation of a circuit having a DC power supply, a load, and a switch element connecting the DC power supply to the load, the system comprising:
    a sensor element having a first input node, a second input node, and an output node;
    a capacitive element coupling the first input node of the sensor element to a first interconnection node of the circuit between a first voltage supply terminal of the DC power supply and the load; and
    a grounding structure coupling the second input node of the sensor element to a ground plane that is galvanically isolated from the DC power supply, wherein the grounding structure is positioned with respect to a second interconnection node of the circuit between a second voltage supply terminal of the DC power supply and the load so as to define a stray capacitance for carrying a transient signal resulting from an opening or closing of the switch element.

2. The system of claim 1, further comprising: a receive circuit coupled to the output node of the sensor element and configured for processing an output signal at the output node.

3. The system of claim 2, wherein the receive circuit is configured for generating a fault signal in response to failing to detect from the sensor element an intended opening or closing of the switch element.

4. The system of claim 3, wherein the receive circuit further comprises a gated latch circuit for maintaining the fault signal until a power supply for the receive circuit is disconnected.

5. The system of claim 3, wherein the receive circuit further comprises a gated latch circuit for maintaining the fault signal until a reset signal is received.

6. The system of claim 1, wherein a distance between the grounding structure and the second interconnection node is between about 0.5 inches and about 5 inches.

7. The system of claim 1, wherein the transient signal is generated by a response of a parasitic inductance of the circuit to the at least one of the opening of the switch element and closing of the switch element.

8. A battery operated system, comprising:
    a battery module;
    a load circuit;

a switch element for coupling the battery module to the load circuit;

a controller element for operating the switch element and having a grounding structure coupled to a ground plane that is galvanically isolated from the battery module; and a path coupling a first interconnection node between a first supply terminal of the battery module and the load circuit to a second interconnection node between a second supply terminal of the battery module and the load circuit, the path including a capacitive element coupling the controller element to the first interconnection node and a stray capacitance coupling the controller element to the second interconnection node, wherein the grounding structure is positioned with respect to the second interconnection node so as to define the stray capacitance, and wherein the stray capacitance is configured for carrying a transient signal resulting from an opening or closing of the switch element.

9. The system of claim 8, wherein a distance between the grounding structure and the second interconnection node is between about 0.5 inches and about 5 inches.

10. The system of claim 8, wherein the transient signal is generated by a response of a parasitic inductance of the system to the opening or closing of the switch element.

11. The system of claim 8, wherein the controller element includes a sensor element having a first input node coupled to the capacitive element, a second input node coupled to the grounding structure, and an output node.

12. The system of claim 11, wherein the controller further comprises a receive circuit coupled to the output node of the sensor element and configured for processing an output signal at the output node.

13. The system of claim 12, wherein the receive circuit is configured for generating a fault signal in response to failing to detect from the sensor element an intended opening or closing of the switch element.

14. The system of claim 13, wherein the receive circuit further comprises a gated latch circuit for maintaining the fault signal until the occurrence of a reset event.

15. The system of claim 13, wherein the controller is configured for disconnecting the battery module from the load circuit in response to the fault signal.

16. A method for monitoring operation of a circuit having a DC power supply, a load, and a switch element connecting the DC power supply to the load, the method comprising:

capacitively coupling a first input node of a sensor element to a first interconnection node of the circuit between a first supply terminal of the DC power supply and the load;

coupling a second input node of the sensor element to a grounding structure coupled to a ground plane galvanically isolated from the DC power supply, the grounding structure being positioned with respect to a second interconnection node of the circuit between voltage second supply terminal of the DC power supply to define a stray capacitance for carrying a transient signal resulting from an opening or closing of the switch element; and processing an output signal at an output node of the sensor element.

17. The method of claim 16, wherein the step of processing further comprises generating a fault signal in response to failing to detect from the sensor element an intended opening or closing of the switch element.

18. The method of claim 17, wherein the step of processing further comprises maintaining the fault signal until the occurrence of a reset event.

19. The method of claim 17, wherein the step of processing further comprises disabling the system in response to the fault signal.

* * * * *